Oct. 15, 1929.  E. H. TUBBE  1,731,757
AIRPLANE
Filed Aug. 9, 1926  3 Sheets-Sheet 1
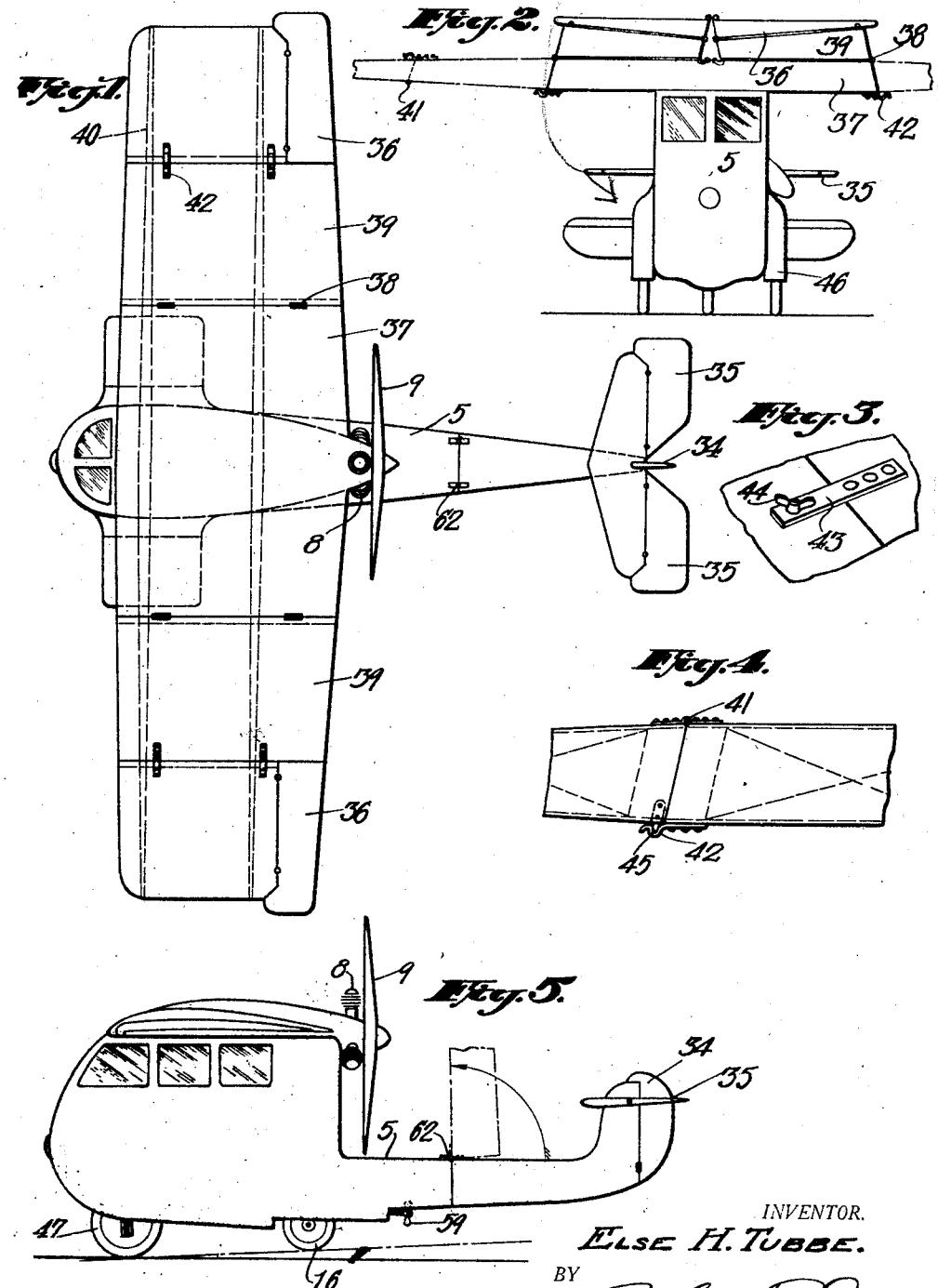
INVENTOR.
ELSE H. TUBBE.
BY Richard B. Owen
ATTORNEY.

Oct. 15, 1929.  E. H. TUBBE  1,731,757
AIRPLANE
Filed Aug. 9, 1926   3 Sheets-Sheet 2
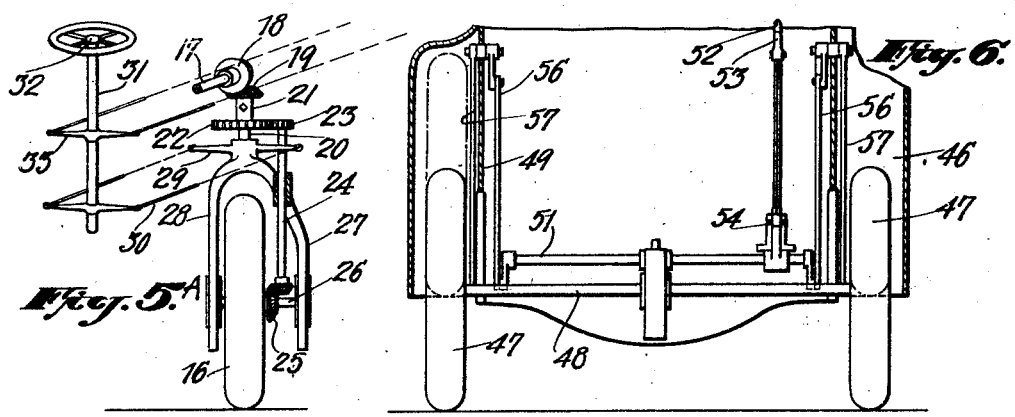
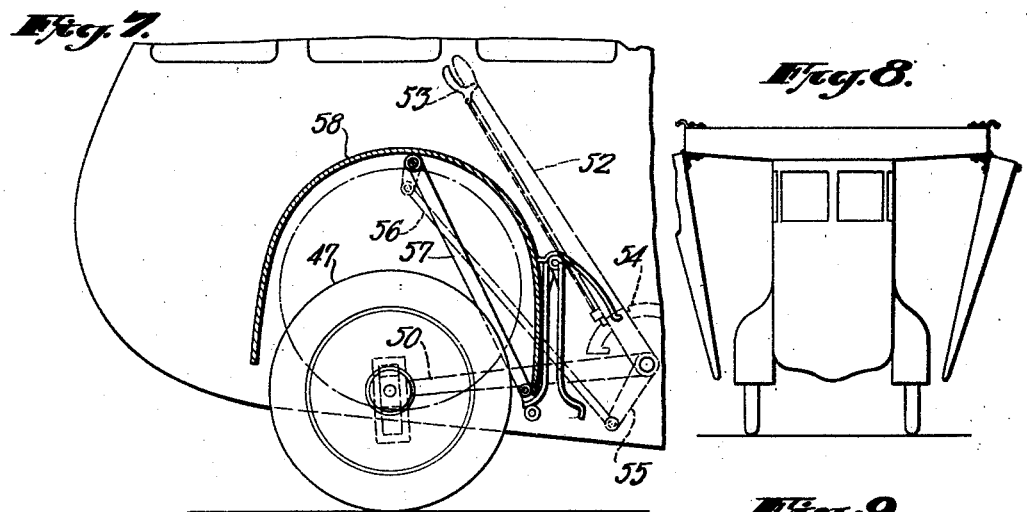
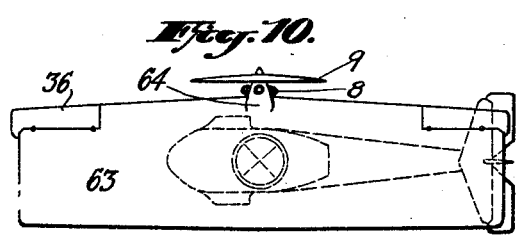
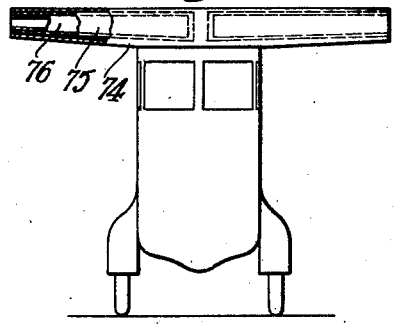
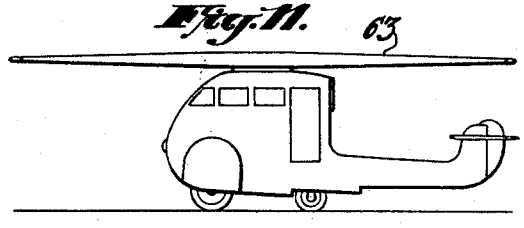
INVENTOR.
ELSE H. TUBBE.
BY
ATTORNEY.

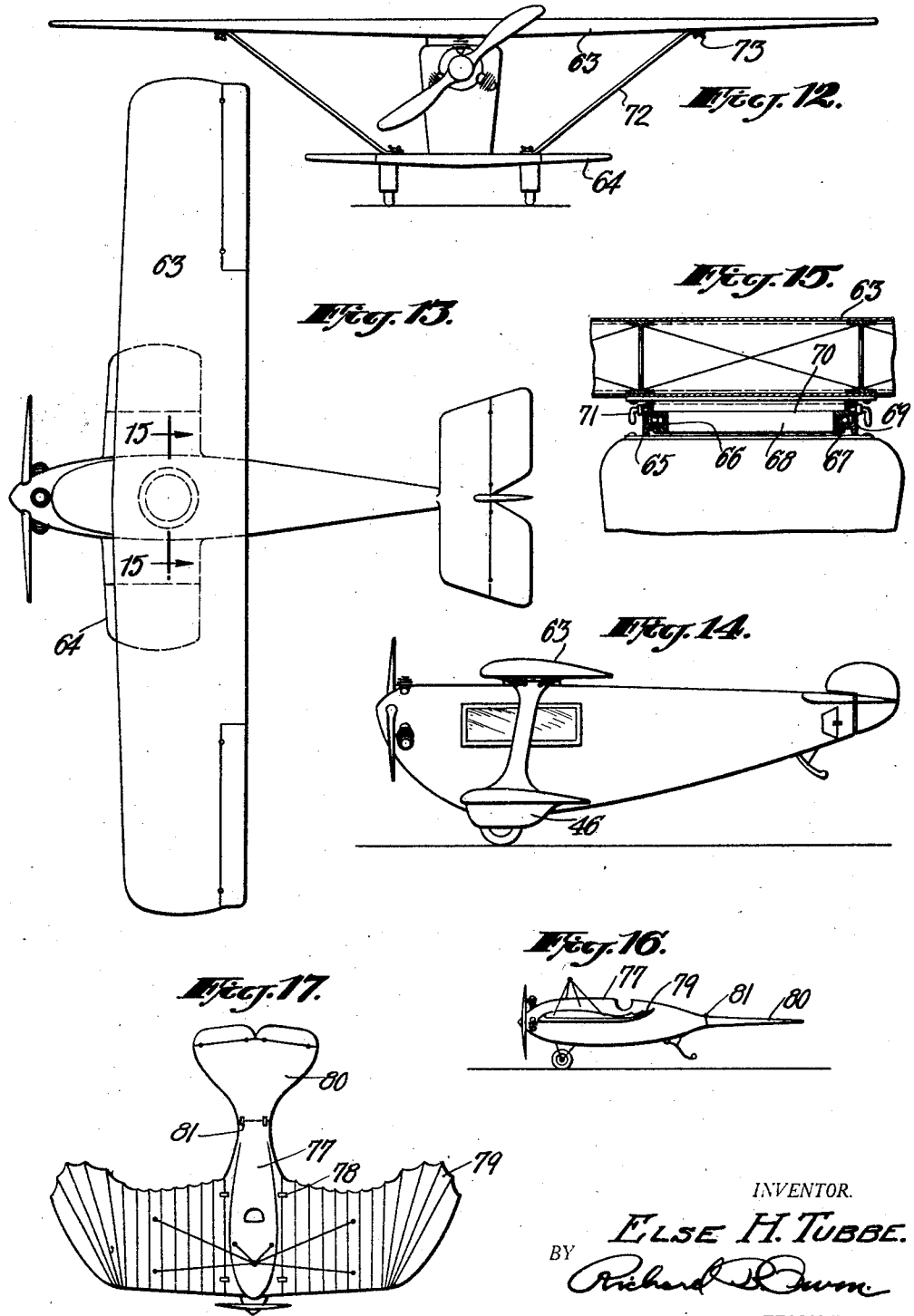

Patented Oct. 15, 1929

1,731,757

UNITED STATES PATENT OFFICE

ELSE H. TUBBE, OF BROOKLYN, NEW YORK

AIRPLANE

Application filed August 9, 1926. Serial No. 128,318.

This invention relates to aircraft and in particular to forms of airplanes adapted for various purposes.

A particular object of the invention is to provide an airplane, the wings and tail of which may be folded or disconnected to provide compactness in storage or shipment and also to decrease the wing spread and over-all length of the plane when the same is used for a land vehicle.

A further particular object of the invention is to provide an airplane which may be used as an aquaplane, as a motor-boat, as a land vehicle or as an over-land vehicle in the nature of an airplane, the objects of the invention being carried out through the medium of suitable mechanism adapting the plane for propulsion on land and water and through the air.

A further particular object of the invention is to provide means for adapting a plane for use as a boat and as a land vehicle and also for providing for the folding or detachment of the various parts thereof so that a vehicle of over-all length and width of reduced dimensions is provided.

A further particular object of the invention is to provide a plane having a rotary wing, which can be moved to a position in alignment with the body of the plane so that the same can be used as a land vehicle, if desired.

A further particular object of the invention is to provide a plane, the wings of which can be folded or detached so that a greater or lesser wing spread may be provided as desired.

A still further object of the invention is to provide a telescopic wing, the parts of which, when telescoped into each other, bring the width of the plane down to a minimum whereby the same may be used as a land vehicle.

A further particular object of the invention is to so shape a plane of this character that it will offer very little resistance to air or water during its travel in either and one which can be constructed of light material so that a minimum amount of propelling power is necessary in the operation thereof.

To enable others skilled in the art to fully comprehend the underlying features of my invention that they may embody the same in the various modifications in structure and relation contemplated, a drawing depicting a preferred form has been annexed as a part of this disclosure and in such drawings, similar reference characters denote corresponding parts throughout all the views, of which, Figure 1 is a top plan view of an airplane, the wing of which is provided with hinged sections which may be removed to provide for compactness in storage and also to reduce the width of the plane when the same is used as a land or water vehicle.

Figure 2 is a front view in elevation of the plane shown in Figure 1, the wings thereof being folded up to their compact position and the vehicle being shown for use on land.

Figure 3 is a view in perspective showing how the connecting straps may be attached to the adjoining parts of the wings so that the parts of the wings may be taken apart for storage or other purposes.

Figure 4 is a view in side elevation of the hinge and snap holding member through the medium of which the wing parts are kept in longitudinal alignment, and in open position.

Figure 5 is a side view in elevation of a plane as shown in Figure 2, the interior thereof being shown so that the working parts thereof may be illustrated.

Figure 5$^A$ is a view in perspective of the steering arrangement.

Figure 6 is a front view in elevation of the landing gear of the plane shown in Figure 5, the housing of the plane being cut away to illustrate the operating mechanism for raising and lowering the wheels.

Figure 7 is a view in side elevation, a part thereof being shown in section, illustrating the leverage mechanism for raising and lowering the landing gear wheels so that the same may be drawn into a housing and the housing covered when the vehicle is used for water transportation.

Figure 8 is a modified form of wing construction showing the outer end of the wings arranged to fold down over the sides of the body of the plane this being the opposite of the construction shown in Figure 2 in which the wings fold upwardly and rest on the top of the center section of the wings.

Figure 9 is a further modified form showing the telescopic arrangement of the wings whereby the outer ends of the wings may be telescoped into the central portion to reduce the over-all width thereof.

Figure 10 is a top plan view of a plane constructed with a revolvable wing, which is arranged to carry in the front portion thereof, the motor and the propellers, the wing itself being pivoted in the top of the body of the plane and being adapted to swing to a position longitudinally of said body.

Figure 11 is a view in elevation showing the wing in longitudinal alignment with the body of the plane.

Figure 12 is a view in front elevation of a plane constructed with a top wing which is adapted to be revolved to position, in longitudinal alignment with the body of the plane, the improved construction showing the use of strut members which hold the plane in its lateral position relatively to the body of the plane.

Figure 13 is a top plan view of the plane shown in Figure 12 and shows the revolving pivot point upon which the wing is swung to bring it into alignment with the body of the plane.

Figure 14 is a still further showing of the revolvable wing construction used in connection with a different type of plane body, this type being commonly known as the aquaplane and the motor and propeller being mounted at the forward part of the body instead of in the wing, suitable struts also being shown in connection with this view for holding the plane in its lateral position relative to the body of the vehicle.

Figure 15 is a section taken on the line 15—15 of Figure 13 showing the construction of the wing and the mounting therefor which adapts it to be revolved to a position in alignment with the body of the plane.

Figure 16 is a side view in elevation of a further modified form of plane or glider in connection with which the wings are adapted to be folded up as is also the tail, and Figure 17 is a top plan view of the plane shown in Figure 16 illustrating the hinged portions of the wings and tail whereby the same may be compactly folded up for shipping or other use.

Referring to the drawings in detail, 5 indicates a plane of usual construction but shaped to provide the usual stream line effect whereby passage through the air is accomplished with the slightest air friction, whereby the speed of the plane is increased and the consumption of power is reduced to a minimum. The body of the plane 5 may be of the usual steel or light wooden construction covered with fabric, as is well-known in the airplane art and may be arranged to provide the operator's cabin 6, in which is provided the usual controls for manipulating the plane, all of which are not shown in Figure 5 but which are thoroughly understood by one having a knowledge of the art. In Figure 5 I have shown the interior construction of the plane which includes a power driven shaft 7 operated through the medium of the usual "gnome" type engine 8 to the end of the shaft 7, there being secured the propeller 9, which acts to drive the plane through the air. In my improved construction, I have provided in connection with the shaft 7, a counter shaft 10 which is driven through the medium of the sprocket chain 11, the same being operable through the operation of a clutch 12, used in connection with the power shaft 7 and through the medium of which the engine 8 may transmit power to the counter shaft 10, which is suitably connected through gearing 13 to the transmission 14. This transmission is controlled by the usual lever 15 and operates through suitable gearing, the rear drive wheel 16.

Referring now to Figures 5 and 6, this wheel driving mechanism comprises the shaft 17 which passes through the transmission housing 14 and carries at its rear end, the bevel gear 18, which meshes with a similar bevel gear 19 carried on the upper end of a fixed post 20. This post carries the sleeve 21 to the lower end of which is secured the driving gear 22, which is in mesh with and drives a pinion 23 secured to the upper end of the drive shaft 24, which, through the medium of suitable bevel gears 25, operates the wheel axle 26 upon which the wheel 16 is mounted, this axle 26 being journaled in the leg 27 of a frame 28 which is provided with two oppositely extending arms 29 to which is secured the steering rod or wires 30, which extend forwardly to their connection with a suitable cross piece, carried on the lower end of the steering post 31, which is provided at its upper end with a steering wheel 32, the intermediate portion of the steering post 31 being provided with an additional cross piece 33, which operates the vertical rudder 34.

The elevators of the plane 35 are controlled in the usual manner as are also the ailerons 36. In view of the construction outlined in this application, it is not believed that the operating controls of the airplane need be shown, such as the aileron control and the controls of the right and left elevator flaps. Suffice it to say that the parts of the plane are controlled by the operator in the usual manner.

One of the particular objects of the invention is brought out by using the power from the engine to operate the rear wheel 16 so that the plane, when the wings thereof are folded up, can be used as a land vehicle and be propelled through the motor shaft and the mechanism heretofore described without operation of the propeller 9.

In folding the wings, I have provided a central section 37 to which is hinged as at 38, the intermediate section 39, the end section 40 being also suitably hinged to said intermediate section 39 through the medium of the suitable hinges 41, the outer section 40 may be held in position through the medium of a suitable snap hook 42 or may be fixedly connected through the medium of a strap 43 whose outer end is secured in position against the end piece 40 by the wing nut 44.

In Figure 4, I have shown in detail, the snap hook 42, the end of which fixedly latches over a suitable projection 45 secured on the next adjacent wing portion, the hinge 41 being illustrated on the opposite side of the wing. With this construction it is evident that as shown in Figure 2, the parts of the plane wing can be folded upon themselves over and upon the central section 37 of the wings so that the over-all width of the plane is reduced when the same is to be used for travel on land or upon the water as a boat or land vehicle.

In Figure 2, it will be noted that I have provided wheel compartments 46 in connection with the body of the plane, the wheel compartments being arranged so that the front supporting wheels 47 of the vehicle or plane are housed therein and in adapting the plane to travel on the water as a boat, it is necessary to provide a water-tight housing, when the wheels are drawn up and to this end, I provide in connection with the wheels 47 which are mounted upon the shaft 48, journaled in the walls 49 of the vehicle or plane body, an operating lever 50 which is pivoted at its rear end to the cross shaft 51, this shaft also carrying the operating lever 52 so that movement is controlled through the medium of the latch 53 which operates in the segmental plate 54. This arrangement is for the purpose of retaining the wheels in their downward or upward position when the vehicle is traveling on land or in the water. In order to provide for the closure of the compartment 46, I have secured to the extended ends of the shaft 51, the lever arms 55, which in turn, are connected through the medium of the links 56 and 57 with the end of a flexible strip plate 58. It is evident that a movement of the handle 52 will cause a throw-up of the lever end 50 to raise the wheels, at which time the extensions 55 will cause operation of the links 56 and 57 as apparent from inspection of Figure 7 to cause a swinging of the lever 57 arcuately whereby the cover plate 58 will be drawn downwardly and around the lower, open edge or end of the housing 46 to thereby securely close the same and maintain them in water-tight condition when the plane is used in the water. The withdrawal of the wheels into the housing will lessen the resistance offered by the plane and its passage through the water will be facilitated.

The body of the vehicle is propelled through the water through the medium of a suitable propeller 59 which is carried on the end of a propeller shaft 60 which is driven through the medium of suitable sprockets and chains 61 from the counter shaft 10 hereinbefore referred to.

It is evident that the plane can therefore be operated to glide through the air, can be operated for propulsion along the ground through the medium of its driving wheel 16 through which it is also steerable and may be driven through the water by the propeller 59 which is controlled in its operation from the main shaft 7 through the medium of the clutch 12 which also controls the operation of the driving mechanism associated with the driving wheel 16.

In Figure 5 I have shown the tail end of the plane hinged to the body portion thereof through the medium of a suitable hinge 62. This arrangement is for convenience in shipping the plane and also for compactness when the plane is operated as a land vehicle and no use is to be made of the tail thereof for steering. This arrangement also allows the plane to be parked when used as a vehicle in a very small space and in connection with my improved wing construction, the tail may be bent up to be positioned under the wing when the same has assumed its longitudinal position relatively to the body of the plane, as is the case in the Figures 10 and 11, wherein I have shown a wing member 63 at the edges of which are provided the ailerons 36, the wing itself being provided with an enlarged central, rearward portion 64 which provides a housing for the motor 8 and propeller 9, it of course being understood that the motor and propeller will be swingable with the plane when the same is brought into longitudinal alignment with the body of the vehicle. In order to provide for this swinging of the wing, I position on the top of the body at the center thereof, a retaining ring 65 having a flange 66 which overlies the flange 67 formed on a revolvable ring member 68, this latter being provided with a ball race-way 69 and an upstanding flange portion 70 to the upper end of which is fastened the body of the wing 63, the interior construction of which can be made of the usual braces and guy wires and struts as common in airplane construction. The ring portion of the retainer plate 65 is provided with locking members 71 which are arranged to frictionally hold the ring 68, no matter what position it is turned to, so that it is evident these locking members will hold the plane in its lateral position relatively to the body of the vehicle and will also secure the same in longitudinal position relative to the body as before mentioned. In order to more fully hold the wing 63 in its lateral position I provide struts 72 which are secured through the medium of the wing nuts 73 with the upper wing 63 and the lower wing or plane 64 so that the same can be readily detached when it is desired to swing the upper plane or wing 63 to its longitudinal position. It is evident, therefore, that I have provided a plane which can be reduced substantially in width and which can be used as a water, land or air vehicle without adding or detracting therefrom any of its essential working parts and one which can be converted in an instant and adapted for use for travel on land, in the water or in the air.

In Figure 9 I have shown a still further means of reducing the width of the wings by providing a hollow construction thereof which will permit the parts to telescope one within the other, the main portion of the wing, as indicated as at 74, being hollowed in its edges to provide a housing for the intermediate wing portion 75 which is also adapted to receive the end portion 76 of the wing, it being evident, that when the portion 76 is drawn out to its full length, it will draw with it, the portion 75 until the wing is completed after which the parts may be locked in any suitable manner to provide the over-all length of the wings.

In Figures 16 and 17 I have shown my improved construction in the nature of a glider plane 77 to which is hinged as at 78, the more or less flexible wing member 79, the tail 80 of the plane being hinged as at 81 to the body portion 77 thereof and the whole being adapted for folding so that the plane can be shipped conveniently.

In Figure 14 I have shown a plane body of stream line construction showing the use of the housings 46 hereinbefore referred to, which may act when sealed as pontoons when the plane is to alight or start from the water. It is evident therefrom that I have provided a plane, the parts of which are readily demountable and also have provided in connection with the plane mechanism which enables the same to be operated in the water, on land, or in the air and in connection with the land travel, have provided in connection with this plane, means whereby its over-all width may be substantially reduced so that the same is adapted for street travel in cities without presenting an unwieldy appearance and obstructing the passage of other vehicles on the streets or highways. It is also understood that I have provided a plane which can be used as a glider, which can be constructed with foot power and in which the wings and tail can be removed when the plane is to be transported. I have also provided a plane for use on the land as a motor vehicle and in the water as a boat without using as propelling power therefor the air propeller, which would be dangerous if used on the streets or in crowded waterways with other water craft.

It is also evident that I have provided a vehicle, the wings of which may be folded down and the tail folded upward or the wings revolved over the whole surface lengthwise of the vehicle to reduce the over-all width of the plane. It is also evident that I have provided a plane which may be operated through the water through the medium of a propeller and which is rendered non-sinkable through the medium of its light, buoyant construction.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. A vehicle adapted to serve as an aircraft comprising a body portion, a wing secured thereto and said wing being formed from a fixed section and a plurality of relatively movable sections, the latter of which are adapted to be moved to a position on top of said fixed section to reduce the width of the vehicle.

2. A vehicle adapted to serve as an aircraft comprising a body portion, a central wing section secured thereto and said wing having pivoted thereto hinged sections which are adapted to be folded over on top of said central section to reduce the width of the vehicle.

3. A vehicle adapted to serve as an aircraft comprising a body portion, a central wing section secured thereto, said wing having pivoted thereto a plurality of relatively hinged sections which are adapted to be folded to a position on top of the central section to reduce the width of the vehicle, and the hinge points of said sections being alternately on top and bottom of the wing, and the wing tapering from its center towards its ends whereby when it is folded it is of substantially rectangular shape.

4. A vehicle adapted to serve as an aircraft comprising a body portion, a central wing section secured thereto and said wing having outer sections hinged thereto which are adapted to be folded on top of said central section to reduce the width of the vehicle, and the tail end of the fuselage hingedly connected to said body portion, and arranged to be folded up to a point adjacent said central winged section.

5. An air craft comprising a body, a wing mounted on said body, the wing being sectionally hinged whereby it can be reduced in length to effect an over-all reduction in the width of the vehicle and can be arranged in superposed relation to said body, and means for preventing free movement of the wing sections at their point of hinged connection.

6. A vehicle arranged for air travel comprising a body, a central wing section fixed on the body, a plurality of sections hinged thereto whereby the wing can be reduced in length by being folded on top of said central section to effect an over-all reduction in the width of the vehicle and a hinged connection of the fuselage tail to the body whereby the latter can be reduced in length.

7. A vehicle adapted to serve as an aircraft comprising a body portion, a wing secured thereto and said wing being formed from a fixed section and a plurality of relatively movable sections, the latter of which are adapted to move to a horizontal position on top of said fixed section to reduce the width of the vehicle.

8. A vehicle adapted to serve as an aircraft comprising a body portion, a central wing section secured thereto and said wing having pivoted thereto hinged sections which are adapted to be folded over in superposed relation on top of said central section to reduce the width of the vehicle.

9. A vehicle arranged for air travel comprising a body, a central wing section fixed on the body, a plurality of sections hinged thereto whereby the wing can be reduced in length by being folded on top of said central section in superposed relation to effect an over-all reduction in the width of the vehicle and a hinged connection of the fuselage tail to the body whereby the latter can be reduced in length.

10. A vehicle arranged for air travel comprising a body, a central wing section fixed on the body, a plurality of sections hinged thereto whereby the wing can be reduced in length by being folded on top of said central section in horizontal position to effect an over-all reduction in the width of the vehicle and a hinged connection of the fuselage tail to the body whereby the latter can be reduced in length.

11. A vehicle adapted to serve as aircraft comprising a body portion, a central wing section secured thereto and said wing having pivoted thereto a plurality of hinged sections at each of its ends which are adapted to be folded over on top of said central section to reduce the width of the vehicle.

12. A vehicle adapted to serve as an aircraft comprising a body portion, a central wing section secured thereto, said wing having pivoted thereto at each end, a plurality of relatively rigid hinged sections which are adapted to be folded into position on top of the central section to reduce the width of the vehicle and the hinged points of said sections being only on top and bottom of the wing and the wing tapering from its center toward its ends whereby when it is folded, it is substantially rectangular in shape.

13. A vehicle adapted to serve as an aircraft comprising a body portion, a central wing section secured thereto and said wing having pivoted to the ends thereof, a plurality of hinged sections which are adapted to be folded over in superposed relation on top of said central section to reduce the width of the vehicle.

In testimony whereof I affix my signature.

ELSE H. TUBBE. [L. S.]